United States Patent [19]

Fountain

[11] Patent Number: 5,006,834
[45] Date of Patent: Apr. 9, 1991

[54] LIQUID LEVEL ALARM

[76] Inventor: David J. Fountain, Box 480, Burns Lake, British Columbia V0J 1E0, Canada

[21] Appl. No.: 323,895
[22] Filed: Mar. 15, 1989
[51] Int. Cl.⁵ .......................................... G08B 21/00
[52] U.S. Cl. ................................. 340/625; 340/623; 340/624; 116/229; 200/84 B; 73/319
[58] Field of Search ...................... 340/623, 624, 625; 116/110, 111, 228, 229; 200/84 B; 73/305, 317, 319

[56] References Cited

U.S. PATENT DOCUMENTS

| | | | |
|---|---|---|---|
| 2,041,549 | 5/1936 | Jaeger | 340/625 |
| 3,310,795 | 3/1967 | David | 340/624 |
| 3,707,940 | 1/1973 | Sherrick et al. | 116/111 |
| 3,786,464 | 1/1974 | Staempfli | 340/623 |
| 3,932,853 | 1/1976 | Cannon | 340/625 |
| 3,953,845 | 4/1976 | Kress | 340/625 |
| 4,380,091 | 4/1983 | Lively . | |
| 4,409,694 | 10/1983 | Barrett, Sr. . | |
| 4,429,422 | 2/1984 | Wareham . | |
| 4,563,780 | 1/1986 | Pollack . | |
| 4,696,428 | 9/1987 | Shakalis . | |
| 4,700,884 | 10/1987 | Barrett et al. . | |
| 4,771,272 | 9/1988 | Barnes | 340/624 |

FOREIGN PATENT DOCUMENTS

| | | | |
|---|---|---|---|
| 1914431 | 4/1969 | Fed. Rep. of Germany | 116/110 |
| 2184546 | 6/1987 | United Kingdom | 340/623 |

Primary Examiner—Donnie L. Crosland
Assistant Examiner—Kinfe-Michael Negash
Attorney, Agent, or Firm—Shlesinger & Myers

[57] ABSTRACT

An apparatus for providing a signal to indicate liquid level above a pre-determined level in a container. The apparatus includes a device for defining a fixed reference level. An alarm unit having an alarm and an alarm actuator is connected to the defining device. A float is connected to the alarm unit and rests on the surface of the liquid. The float actuates the alarm actuator to activate the alarm when the surface of the liquid reaches the pre-determined level.

22 Claims, 3 Drawing Sheets

LIQUID LEVEL ALARM

BACKGROUND OF THE INVENTION

1. Field of the Invention

The invention relates to a device for sounding an alarm when the liquid level in a container reaches a pre-determined level.

2. Background

There are many instances where a container is required to be filled to a pre-determined level with a liquid such as water. One such instance is that of filling a bathtub with water.

Many bathtubs include a hot water valve, a cold water valve and a faucet for directing hot and cold water into the tub. To fill the tub one normally adjusts the hot and cold water valves to obtain a desired flow rate and temperature of water flowing from the faucet. Many people simply set the hot and cold water valves and leave the water to fill the tub unattended. Depending upon the size of the tub and the flow rate of the water from the faucet, a considerable amount of time may pass before the water level in the tub reaches a desired level. During this time the person waiting for the water in the tub to reach an appropriate level may forget that water is running in the tub or may be distracted by other activities.

The water level in the tub may go unnoticed and approach the top portion of the tub. The water level may rise above the sides of the tub and excess water will overflow from the tub.

There is often no warning that water in the tub is about to overflow and the water from the faucet is only shut off after the overflow of water is noticed. By that time, considerable water damage may occur. To prevent this damage, an apparatus is required to issue a signal when the water level in the tub reaches a pre-determined level. One can then be reminded that the water has filled the tub to the pre-determined level and the water can be shut off before overflowing the tub.

Many bathtubs have an overflow outlet disposed near the top portion of the tub to drain off water when the water level is too high. However, depending upon the flow rate of water from the faucet and the flow rate of water from the drain, the drain may not be able to keep up with the flow from the faucet and the net effect may be that the tub continues to be filled and the water level continues to rise.

SUMMARY OF THE INVENTION

According to the invention, an apparatus for providing a signal to indicate liquid level above a pre-determined level in a container includes defining means for defining a fixed reference level. An alarm unit, having an alarm and an alarm actuator, is connected to the defining means. A float is connected to the alarm unit and rests on the surface of the liquid. The float moves with respect to the fixed reference level and activates the alarm actuator thereby actuating the alarm when the surface of the liquid reaches the pre-determined level.

Advantageously, the apparatus further includes connecting means for connecting the float to the alarm actuator. The connecting means is operable to transmit movement of the float to the alarm actuator.

Alternatively, the apparatus includes a link for connecting the defining means to the alarm actuator. The link has means for length adjustment and enables the pre-determined level to be set.

DESCRIPTION OF THE PREFERRED EMBODIMENT(S)

Figure 1:
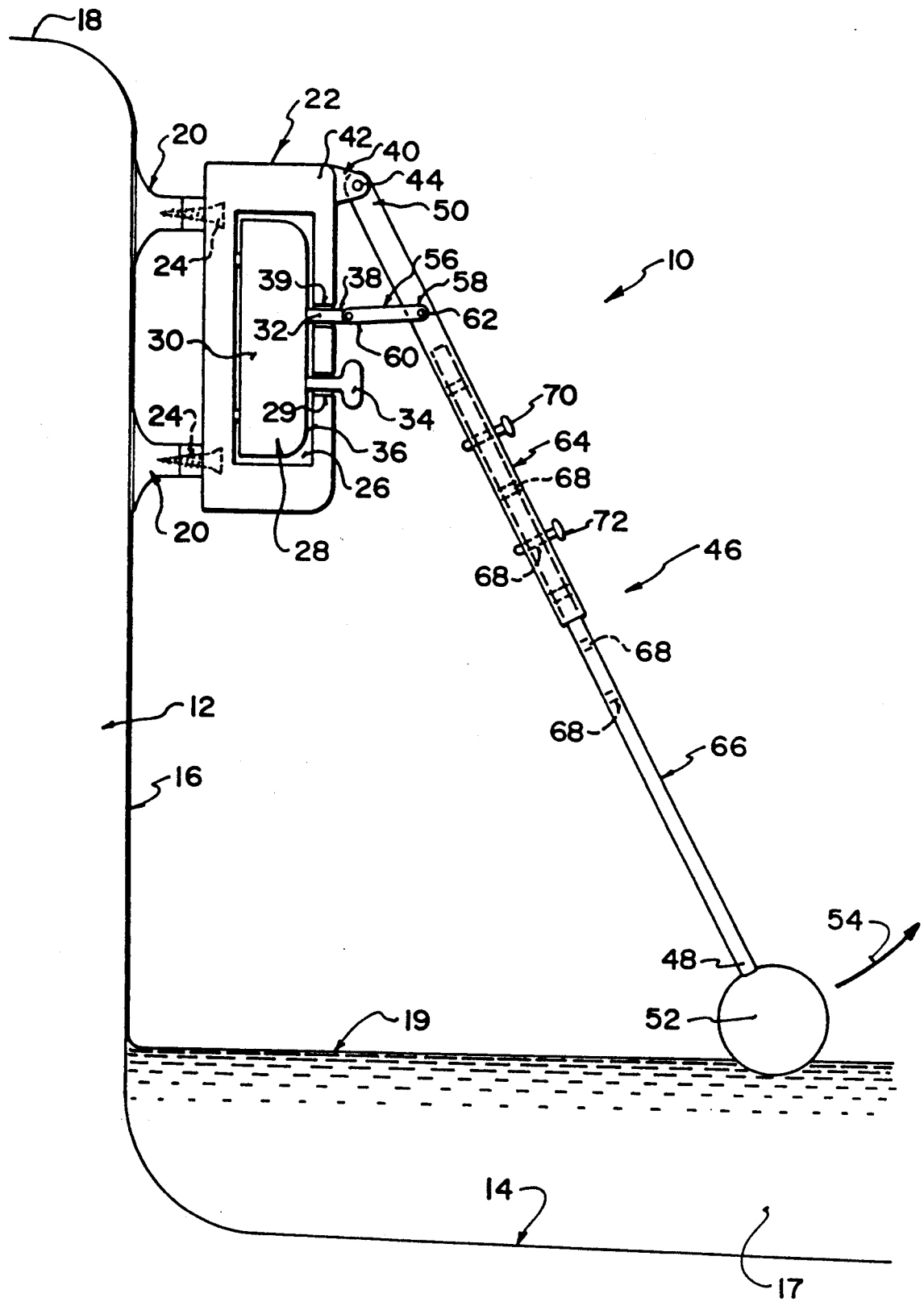
FIG. 1 is a simplified side view of an apparatus according to a first embodiment of the invention.

Referring to FIG. 1, an apparatus for providing a signal to indicate liquid level above a pre-determined level in a container is shown generally at 10. Apparatus 10 is shown secured to bathtub 12 having bottom portion 14, sidewall 16 and top portion 18. The tub contains volume of water 17 having surface 19.

Apparatus 10 includes an anchor, in this case a pair of suction cups 20 which are removably securable to a surface of sidewall 16 of tub 12. Suction cups 20 provide defining means for defining a fixed reference level from which the level of water in the tub is referenced. Suction cups may be secured anywhere along sidewall 16 thus enabling the reference level to be fixed at any position thereon.

Alarm housing 22 is fastened to suction cups 20 by screws 24. Alarm housing 22 has cavity 26 in which an alarm unit, shown generally at 28, is secured. Alarm unit 28 may be fastened to alarm housing 22 by screws, glue or other means.

Alarm unit 28 is similar to that normally found in mechanical clocks. In this embodiment, the alarm unit is Westclox Model No. 77 which includes a clock unit and an alarm unit. The Westclox device is modified by removing the clock unit and employing the alarm unit only. The alarm unit includes an alarm 30 comprising a frame, winding mechanism, bell, hammer and gears (all not shown) which cooperate to ring the bell. The winding mechanism includes a key 34 which allows a user to wind a spring thereby determining the period of time for which the hammer hits the bell when the device is actuated. The key 34 extends from rear portion 36 of the alarm unit 28 and through opening 29 in the alarm housing 22.

The alarm unit 28 further includes alarm actuator 32 which has a first end portion (not shown) connected to the alarm 30 and has a second end portion 38 extending from rear portion 36 of alarm unit 28. The second end portion further extends through opening 39 in alarm housing 22. Assuming the spring has been wound, when the second end portion 38 is pushed in, towards the rear portion 36 of the alarm unit 28, the alarm 30 is disabled. Conversely, when the second end portion is pulled away from the rear portion 36, the alarm 30 is enabled.

The alarm housing 22 further includes a pair of parallel, spaced apart projections 40 extending from a top rear portion 42 thereof. The projections 40 support a pin 44 which extends between the projections.

A member shown generally at 46 has a first end portion 48 and a second end portion 50 disposed at opposite ends thereof. The first end portion 48 is connected to a float 52. The second end portion 50 is pivotally connected to the alarm unit by the pin 44 extending between projections 40. The float 52 rests on the surface 19 of the water 17. As the water level in the tub 12 rises, buoyancy forces exerted by the water on the float cause the member 46 to be rotated about the pin 44 in a direction indicated by arrow 54.

A first link 56 has first and second end portions 58 and 60. The first end portion 58 is pivotally connected by the first pin 62 to the member 46 and the second end portion 60 is pivotally connected to the second end portion 38 of the alarm actuator 32. The first link 56 is thus connected between the alarm actuator 32 and the member 46.

The member 46 includes first and second sub-members 64 and 66. The first sub-member 64 is made of a tubular member having an inside diameter capable of receiving the second sub-member longitudinally therein. That is, the first and second sub-members form a telescoping arrangement whereby the second sub-member may be retracted into or extended from the first sub-member. Both the first sub-member and the second sub-member have a plurality of spaced apart openings 68 extending laterally therethrough for receiving fastening pins 70 and 72 through the aligned openings. The ability to adjust the length of the member 46 allows the pre-determined level at which the alarm will sound, to be set without removing and repositioning the suction cups 20 from the sidewall 16 of the tub 12. In effect, the suction cups 20 provide for relatively coarse adjustment of the pre-determined level and the telescoping sub-members provide for relatively fine adjustment.

Operation

Operation of the apparatus is carried out by first moving the member 46 to push the second end portion 38 of the alarm actuator 32 inward towards the rear portion 36 of the alarm unit 28. This has the effect of temporarily disabling the alarm 30.

The apparatus is then held in one hand while the other hand is used to rotate the key 34. Rotating the key has the effect of winding the wind up spring to cock the alarm 30. The apparatus is thus cocked and ready.

The apparatus may first be held up to the sidewall 16 to allow an operator to judge the position of the float relative to the desired water level at which the alarm is to be sounded. The pre-determined level may therefore be set approximately when the desired position has been established. The suction cups 20 may be pressed against the surface of the sidwall 16 thereby securing the apparatus thereto. The surface or the suction cups may be wetted prior to securing the apparatus to provide greater adhesion of the suction cups to the surface.

After securing the appartus 10 to the sidewall 16 as shown in FIG. 1, the float 52 and member 46 will be directed downward toward the bottom portion 14 of the tub 12. The pre-determined level at which the alarm will sound may now be set more precisely by adjusting the length of member 46.

The appropriate length of member 46 may be determined by first removing pins 70 and 72. The member is then rotated in the direction of arrow 54 about pivot pin 44 into an actuation position where the alarm actuator 32 is pulled outwards thereby actuating the alarm 30.

While holding the member 46 in the actuation position, the second sub-member 66 may be retracted into or extended from the first sub-member 64 to place the float 52 at the desired level, thereby setting the pre-determined level. The second sub-member 66 may then be slightly retracted or extended to align its openings 68 with corresponding openings in the first sub-member 64 and pins 70 and 72 may be inserted therethrough thereby locking the first and second sub-members at the desired length of member 46.

The member 46 may then be rotated in a direction opposite that indicated by arrow 54, thereby pushing the actuator 32 inwards and disabling the alarm 30. The apparatus is thus rendered ready for use and water may be allowed to flow into the bathtub.

As water flows into the bathtub, the surface of the water rises. When the surface rises to a point where the float 52 is in contact therewith, buoyancy forces are exerted by the water on the float. The float floats on the surface of the water and is raised upward in the direction of arrow 54 as the surface 19 of the water rises. As the float is raised upward the member 46 is rotated and the pivotal connection of the first end portion 58 of the link is drawn away from the rear portion 36 of the alarm unit 28.. When the float has been raised to the pre-determined level, the first link 56 pulls on the second end portion 38 of the alarm actuator 32 enough to cause the alarm 30 to sound. The member 46 thus acts to transmit movement of the float to the alarm actuator 32 and the first link 56 acts to actuate the alarm when the member is rotated. The member 46 and the first link 56 act as means for connecting the float 52 to the alarm actuator 32. The alarm will continue to sound until the spring is relaxed or until the apparatus is disabled. The apparatus may be disabled by removing it from the sidewall 16 of the tub and rotating the member 46 to push the actuator 32 inwards.

Figure 2:
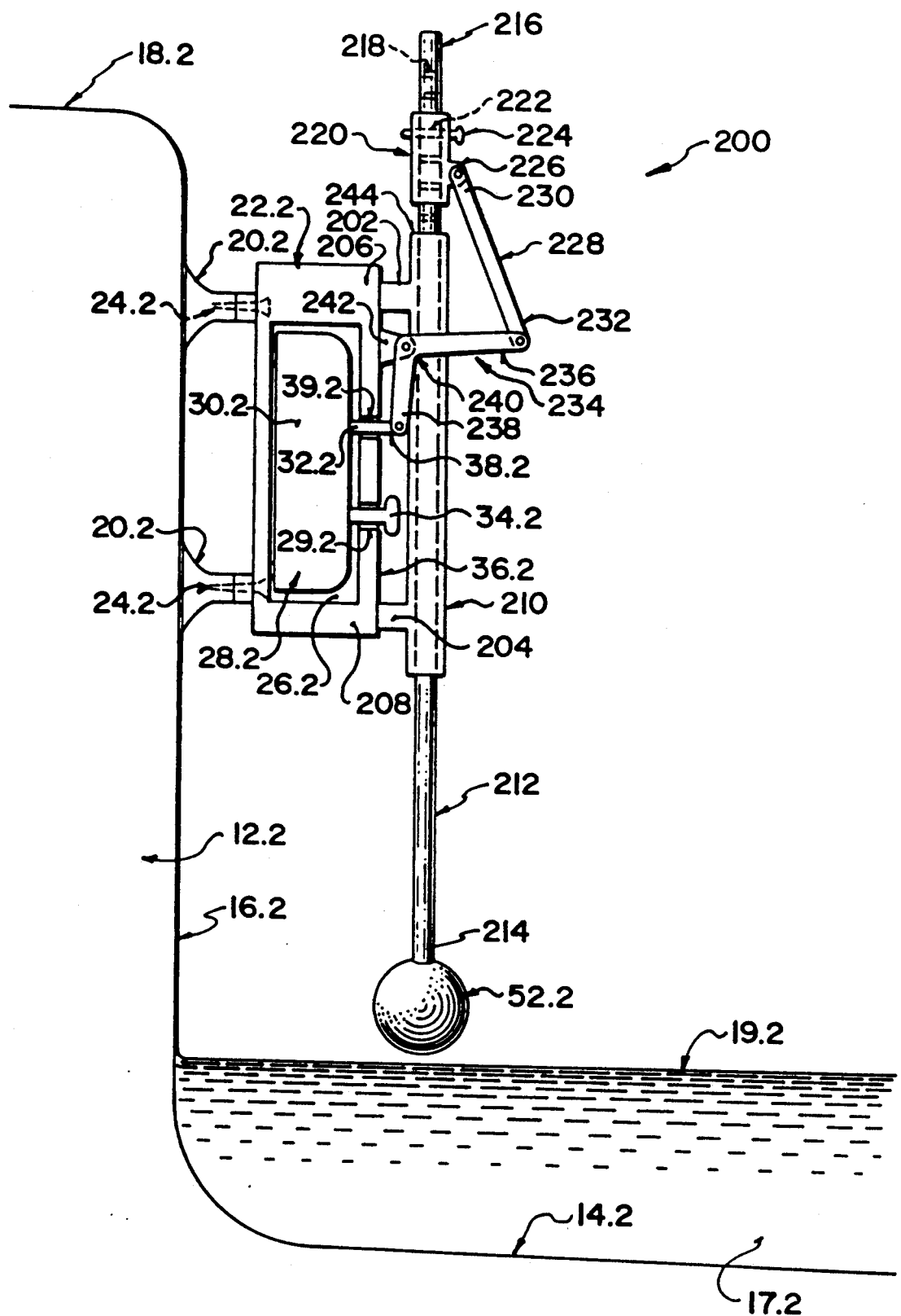
FIG. 2 is a simplified side view of an apparatus according to a second embodiment of the invention.

Referring to FIG. 2, a second embodiment of the apparatus is shown generally at 200. Numerical references of items corresponding to items of the first embodiment are designated by the addition of "0.2". The apparatus of the second embodiment is similar to that of the first embodiment in that it includes a similar alarm housing 22.2, alarm unit 28.2 and suction cups 20.2. The apparatus of the second embodiment is shown secured to a similar bathtub 12.2 having a similar top portion 18.2, bottom portion 14.2 and similar sidewall 16.2. The bathtub contains a similar volume of water 17.2 having a surface 19.2.

The apparatus of the second embodiment has first and second supports 202 and 204 which are connected to top and bottom rear portions 206 and 208 respectively of the alarm housing 22.2. The first and second supports extend outward away from the housing and are connected at outer ends to a tubular guide 210.

A member 212 having a length longer than that of the tubular guide 210 fits inside the tubular guide and is slideable within the guide. The member 212 has a first end portion 214 extending below the guide when the apparatus is in use and has a second end portion 216 extending above the guide.

The first end portion is connected to a float 52.2 which is operable to rest on the surface of the water. The float is similar to the float 52 of the first embodiment. The float rests on the surface of the water and is raised or lowered by buoyancy forces. The guide supporting the member 212 acts to produce linear movement of the member in response to buoyancy forces exerted on the float by the water.

The second end portion 216 has a plurality of openings 218 extending laterally therethrough. A collar 220 is fitted over the second end portion and has a similar plurality of openings 222 which can be aligned with openings 218 by sliding the collar relative to the second end portion. A connecting pin 224 is inserted through the aligned openings 222 and 218 to fasten the collar 220 to the second end portion 216.

The collar 220 has a projection 226 which extends outwardly therefrom. A connecting member 228 having first and second ends 230 and 232 is pivotally connected at its first end 230 to the projection 226. An L-shaped connecting member 234 having a first end portion 236, a second end portion 238 and an elbow 240 is pivotally connected at its first end portion 236 to the second end portion 232 of the connecting member 228. The elbow 240 is pivotally connected to a projection 242 extending from the alarm housing 22.2 and acts as a fulcrum about which the L-shaped connecting member 234 is free to pivot. The second end portion 238 of the L-shaped connecting member 234 is pivotally connected to the second end portion 38.2 of the alarm actuator 32.2. The collar 220, the connecting member 228, and the L-shaped connecting member 234 are connected between the member 212 and the alarm actuator 32.2 and act as a linkage for transmitting vertical linear movement of the member 212 into corresponding horizontal linear movement of the alarm actuator 32.2.

Operation

Operation of the apparatus of the second embodiment is carried out by winding the spring, securing the apparatus to the sidewall of the tub and pushing the alarm actuator inwards to disable the alarm as described in connection with the first embodiment.

After securing the apparatus to the sidewall 16, the desired water level at which the alarm is to be activated can be set. The connecting pin 224 is then removed to allow the second member 212 to slide freely in the collar 220 and in the guide 210. The float 52.2 is then lifted upwards thereby sliding the member 212 vertically upwards with respect to and within the guide 210 to a position representative of the pre-determined level at which the alarm signal is desired. The float 52.2 is then moved slightly upwards or downwards to align the openings 218 in the second end portion 216 of the member 212 with the openings 222 in the collar 220 so that the connecting pin 224 can be inserted therethrough. With the connecting pin 224 inserted through the aligned openings 218 and 222, the collar 220 is fastened to the member 212 and the pre-determined level at which the alarm will sound is set. With the collar 220 fastened to the member 212, the float 52.2 may be gently lowered until the collar rests on a top portion 244 of the guide 210. In this position, the float 52.2 is suspended above the bottom portion 14.2 of the tub 12.2.

As described in connection with the first embodiment, water flowing into the tub will cause the surface 19.2 of the water 17.2 to rise to a level where the float 52.2 is in contact therewith. when the water level comes in contact with the suspended float, buoyancy forces are exerted on the float 52.2 thereby raising the float and causing the member 212 to move linearly in an upward direction.

The upward linear movement of the second member 212 lifts the collar 220 off of the top portion 244 of the guide 210 thereby pulling the connecting member 228 upwards. The upward movement of the connecting member 228 pulls on the first end portion 236 of the L-shaped connecting member 234 causing it to rotate counter clockwise when viewed from the side as seen in FIG. 2.

The counterclockwise rotation of the L-shaped connecting member causes the second end portion 238 of that member to move outward, away from the alarm housing 22.2. The second end portion 238, being connected to the second end portion 38.2 of the alarm actuator 32.2, pulls the alarm actuator outward thereby enabling the alarm to sound. The alarm will continue to sound until the spring is relaxed or until the apparatus is disabled by causing the alarm actuator to be pushed inwards.

Figure 3:
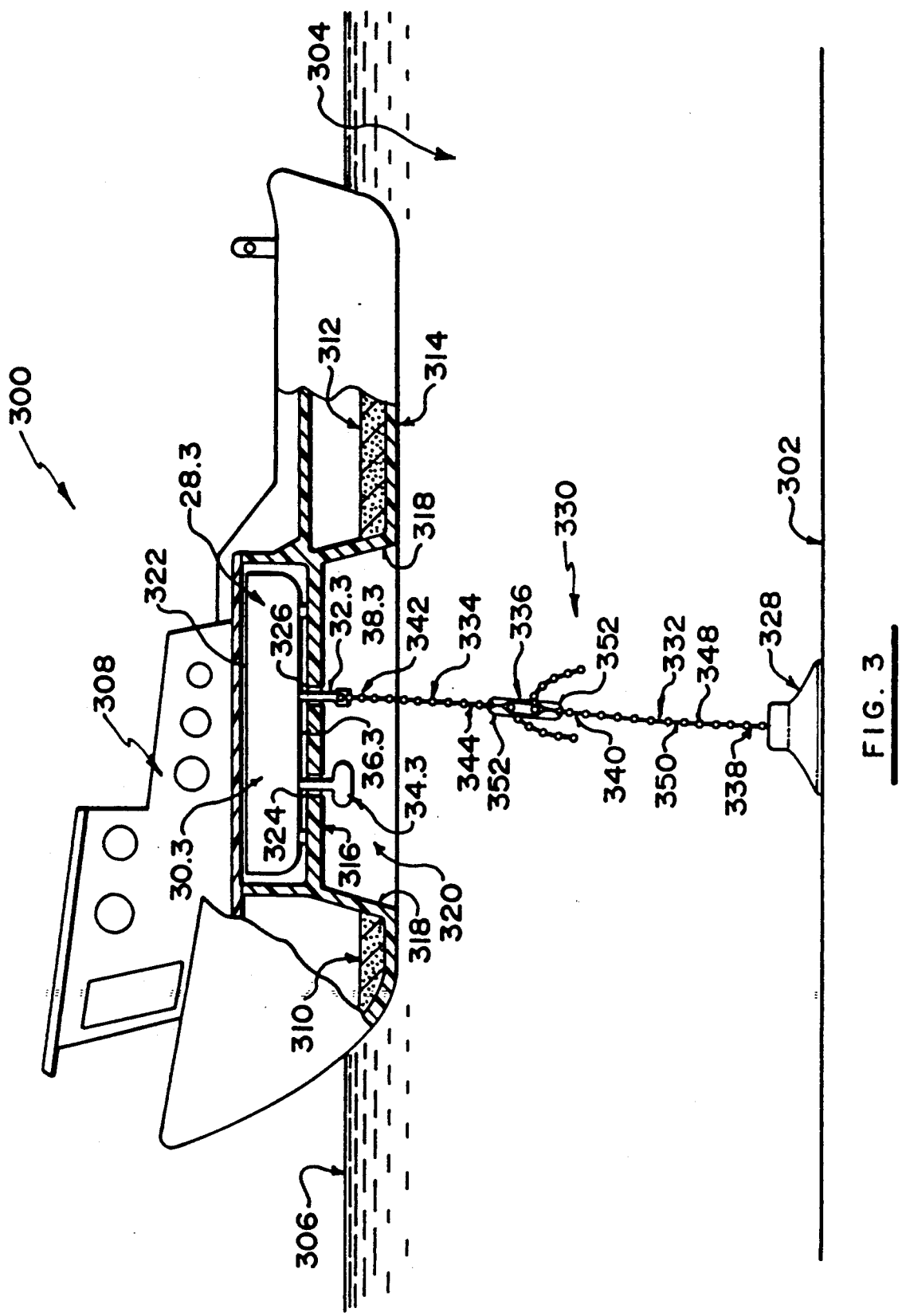
FIG. 3 is a simplified side view of an apparatus according to a third embodiment of the invention.

Referring to FIG. 3, an apparatus according to a third embodiment of the invention is shown generally at 300. Numerical references corresponding to similar items of the first embodiment are designated by the addition of "0.3". The apparatus is shown secured to a bottom portion 302 of a bathtub. The tub contains a volume of water 304 having a surface 306.

The apparatus 300 includes a float 308 in the shape and appearance of a marine vessel such as a tug boat. The float may be made of plastic or other such floatable material. The float has fore and aft ballast areas 310 and 312 disposed along a bottom portion 314 thereof. The ballast areas contain sand or other relatively heavy material which causes the float to have a centre of gravity close to the bottom portion 314, the ballast therefore tends to maintain the float in the orientation shown.

The bottom portion 314 of the float 308 has a raised portion 316. The raised portion is circular in shape and is supported by a sidewall 318 extending between the bottom portion 314 and the raised portion 316. The raised portion 316 and the sidewall 318 define a cavity 320 in the bottom portion of the float. The raised portion 316 also provides a platform in an interior portion 322 of the float 302. An alarm unit 28.3 is secured to the raised portion by glue, screws or other economical fastening means.

The alarm unit 28.3 is similar to that described in the first embodiment. It includes an alarm 30.3 and an alarm actuator 32.3 having a first portion (not shown) and a second portion 38.3. A key 34.3 is connected to the windup spring and extends from a rear portion 36.3 of the alarm unit 28.3 through an opening 324 in the raised portion 316. The second portion 38.3 of the alarm actuator 32.3 extends from the rear portion 36.3 of the alarm unit through a second opening 326 in the raised portion 316. The key 34.3 and the second portion 38.3 of the alarm actuator 32.3 are accessible from the cavity 320 in the bottom portion 314 of the float 308.

The second portion 38.3 of the alarm actuator 32.3 is connected to a suction cup 328 by a length of chain shown generally at 330. The suction cup 322 is removably securable to a surface such as the bottom portion 302 of the tub. The suction cup acts as an anchor and provides defining means for defining a fixed reference level from which the level of water in the tub is referenced. Alternatively, the suction cup 332 may be replaced with a relatively heavy object such as a lead weight etc. The length of chain provides a link for connecting the defining means to the alarm actuator 32.3 of the alarm unit 28.3.

The length of chain 330 has first and second portions 332 and 334 connected together by a connector 336. The first portion 332 has a first end portion 338 which is connected to the suction cup 328. A second end portion 340 is connected to the connector 336. The second portion of chain 334 has a first end portion 342 connected to the alarm actuator 32.3 and has a second end portion 344 connected to the connector 336.

The connector 336 and chain 330 are of the type normally used in connection with wash tub or sink drain plugs. The chain typically has a plurality of links in the form of spherical balls 348 with connecting members 350 therebetween. The connector 336 typically is folded metal having cradles 352 disposed at opposite ends for gripping any of the spherical balls of the first and second portions of chain 332 and 334 to be joined. Thus, connector 336 can be connected anywhere along the first and second portions of chain 332 and 334 and consequently the overall length of the chain 330 can be adjusted. By adjusting the overall length of the chain, the distance between the suction cup 328 and the float 308 can be varied and hence the pre-determined level can be set. The first and second portions of chain 332 and 334 and the connector 336 therefore provide means for length adjustment of the chain 330 to enable the pre-determined level to be set.

Operation

Operation of the apparatus of the third embodiment is carried out by first pushing the alarm actuator 32.3 inwards to disable the alarm and then winding the key 34.3 to render the alarm unit 28.3 operable.

The first portion of chain 332 is then removed from the connector 336 to enable the overall length of the chain 330 to be set. Th length is set by first securing the suction cup 328 to the bottom portion 302 of the tub. This defines the fixed reference level from which the water level in the tub is to be referenced. The float 308 may then be suspended by the operator at a distance above the bottom portion 302 of the tub indicative of the water level at which the alarm is to be sounded. The float is then moved so that the second portion 334 of the chain and connector 336 attached thereto hangs vertically downwards over the suction cup 328.

The first portion 332 of the chain is held vertically upwards, parallel to the hanging second portion 334 of the chain to determine which ball 348 is in line with the lower cradle 344 of the hanging connector. This ball 348 may be identified by counting its position from either the first or second end portions 338 or 340 of the first portion of chain. The float 308 may then be lowered onto the bottom portion 308 of the tub, near the suction cup 328, whereupon the identified ball 348 of the first portion of chain 332 may be fastened to the cradle 352 of the connector 336. The overall length of the chain 330 and hence the pre-determined level at which the alarm 30.3 is to be sounded is set.

Water may then flow into the tub whereupon the float 308 will begin to rest on the surface 306 of the water 304 and be suspended by buoyancy forces exerted by the water on the float. As the water level in the tub rises, the float 308 will be raised vertically, further and further away from the suction cup 328. When the water has lifted the float 308 to a distance above the suction cup 328 equal to the overall length of the chain 330 the chain becomes taught and holds the alarm actuator 32.3 at that distance. A further rise in water level moves the float 308 and hence the alarm 30.3 vertically upward relative to the alarm actuator 32.3, thereby actuating the alarm and causing it to sound. The alarm will continue to sound until the spring is relaxed or until the apparatus is disabled by pushing the alarm actuator 32.3 inwards.

While specific embodiments of the invention have been described, such embodiments should be considered illustrative of the invention only and not as limiting the scope of the invention as construed in accordance with the accompanying claims.

What is claimed is:

1. An apparatus for providing an alarm signal to indicate when liquid reaches a pre-determined level in a container, the apparatus comprising:
   (a) means for pre-determining the level of the liquid at which the alarm signal will actuate;
   (b) a mechanically pre-set non-electrical alarm unit having a mechanical alarm and a push-pull alarm actuator connected to said pre-determining means; and
   (c) a float means for resting on the surface of the liquid connected to said alarm unit and said pre-determining means and movable with respect to the predetermined level of the liquid for moving said actuator in a substantially axial direction to activate said mechanical alarm when the surface of the liquid reaches the pre-determined level of the liquid.

2. An apparatus as in claim 1, wherein:
   (a) said alarm unit includes means for preselecting the length of time during which said alarm is activated.

3. An apparatus as in claim 2, wherein:
   (a) said preselecting means includes a wind-up spring.

4. An apparatus as in claim 1, wherein:
   (a) said alarm unit includes a mechanical timer.

5. An apparatus as in claim 1, wherein:
   (a) said pre-determining means includes a housing; and
   (b) said alarm unit is disposed within said housing.

6. An apparatus as in claim 1, wherein:
   (a) said pre-determining means includes an anchor securable to a surface.

7. An apparatus as in claim 6, wherein:
   (a) said anchor includes a suction cup.

8. An apparatus as in claim 1, wherein:
   (a) said float means includes a float and means for connecting said float to said alarm actuator.

9. An apparatus as in claim 8, wherein:
   (a) said connecting means includes a member having first and second end portions;
   (b) said first end portion is connected to said float; and
   (c) said second end portion is pivotally connected to said pre-determining means such that said member is rotated as said float moves with the surface of the liquid.

10. An apparatus as in claim 9, wherein:
    (a) said connecting means includes a link connected between said alarm actuator and said member for moving said actuator in a substantially axial direction when said member is rotated.

11. An apparatus as in claim 9, wherein:
    (a) said connecting means includes means for adjusting the length of said member.

12. An apparatus as in claim 8, wherein:
    (a) said connecting means includes a guide connected to said pre-determining means and a member slidably disposed therein; and
    (b) said member includes a first end portion connected to said float and a second end portion operably associated with said alarm actuator.

13. An apparatus as in claim 12, wherein:
    (a) said connecting means includes a linkage operably associated with said second end portion and said alarm actuator such that linear movement of said member through said guide when said float moves with the liquid surface causes movement of said alarm actuator in a substantially axial direction.

14. An apparatus as in claim 13, wherein:
    (a) said linkage is a L shaped member.

15. An apparatus as in claim 12, wherein:

(a) said connecting means includes means for adjusting the length of said member.
16. An apparatus as in claim 1, wherein:
(a) said float means includes a float; and
(b) said alarm unit is disposed within said float.
17. An apparatus as in claim 16, wherein:
(a) said pre-determining means includes an anchor operably associated with said alarm unit.
18. An apparatus as in claim 17, wherein:
(a) said anchor includes a suction cup securable to a surface.
19. An apparatus as in claim 17, wherein:
(a) said pre-determining means includes a link connected to said anchor and said alarm actuator.
20. An apparatus as in claim 19, wherein:
(a) said link is a length of chain.
21. An apparatus as in claim 20, wherein:
(a) said chain includes first and second end portions;
(b) said first end portion is connected to said anchor;
(b) said second end portion is connected to said alarm actuator; and
(c) means for adjusting the length of said chain.
22. An apparatus as in claim 16, wherein:
(a) said float is a toy ship.

* * * * *